(12) United States Patent
Loup et al.

(10) Patent No.: US 6,231,437 B1
(45) Date of Patent: May 15, 2001

(54) MOTOR VEHICLE HEATING AND/OR AIR CONDITIONING DEVICE WITH IMPROVED AIR MIXING

(75) Inventors: Didier Loup, Maurepas; Michel Auvity, Velizy; Jean-Yves Queinnec, Elancourt; Philippe Vincent, Epernon, all of (FR)

(73) Assignee: Valeo Climatisation, La Verriere Cedex (FR)

( * ) Notice: Subject to any disclaimer, the term of this patent is extended or adjusted under 35 U.S.C. 154(b) by 0 days.

(21) Appl. No.: 09/469,208

(22) Filed: Dec. 21, 1999

(30) Foreign Application Priority Data

Dec. 22, 1998 (FR) .................................................. 98 16249

(51) Int. Cl.⁷ ...................................................... B60H 1/04
(52) U.S. Cl. ........................................... 454/160; 454/156
(58) Field of Search ................................... 454/121, 126, 454/156, 159, 160, 161; 165/42, 43

(56) References Cited

U.S. PATENT DOCUMENTS

| | | | |
|---|---|---|---|
| 4,157,113 | 6/1979 | Karran et al. | 165/42 |
| 5,062,353 | 11/1991 | Ostrand | 454/121 |
| 6,036,594 | * 3/2000 | Kwon et al. | 454/156 |

FOREIGN PATENT DOCUMENTS

| | | | |
|---|---|---|---|
| 34 22 182 | * 12/1984 | (DE) | 454/160 |
| 33 44 562 | * 6/1985 | (DE) | 454/160 |
| 38 26 182 | * 10/1989 | (DE) | 454/160 |
| 197 49 104 | 5/1998 | (DE) | . |
| 197 50 381 | 5/1998 | (DE) | . |
| 2 703 305 | 10/1994 | (FR) | . |

* cited by examiner

Primary Examiner—Harold Joyce
(74) Attorney, Agent, or Firm—Morgan & Finnegan, LLP

(57) ABSTRACT

A motor-vehicle heating and/or air conditioning device has a cold-air duct, a hot-air duct housing a heating radiator, a mixing chamber communicating with respective air outlets of the ducts and a mixing means. The mixing means has at least one flap of drum type which, in the "hot" position, closes off the outlet of the cold-air duct, and, in the "cold" position, closes off the outlet of the hot-air duct. The shutter wall of the flap includes at least one recess such that, when the flap is shifted from the "hot" position to the "cold" position, a cold airflow can pass through the recess so as to encounter a hot airflow.

16 Claims, 3 Drawing Sheets

MOTOR VEHICLE HEATING AND/OR AIR CONDITIONING DEVICE WITH IMPROVED AIR MIXING

FIELD OF THE INVENTION

The invention relates to heating and/or air conditioning devices for motor vehicles.

BACKGROUND OF THE INVENTION

It is known to provide a device comprising a cold-air duct, a hot-air duct housing a heating radiator, a mixing chamber communicating with respective air outlets of said ducts, and mixing means suitable for controlling said air outlets in chosen proportions so as to set the temperature of the air in the mixing chamber.

Devices of this type make it possible to mix a flow of cold air originating from the cold-air duct and a flow of hot air originating from the hot-air duct in controlled proportions in order to obtain an airflow at an adjusted temperature in the mixing chamber.

This airflow is then distributed into the passenger compartment of the vehicle by appropriate distribution means, comprising ducts terminating in various vents arranged at chosen locations in the passenger compartment.

The mixing means generally comprise a mixing flap, of the butterfly type, mounted pivotably about a spindle situated close to the heating radiator and including two wings suitable for controlling the outlets of the cold-air and hot-air ducts respectively.

Such a flap can be deflected from one to the other of two extreme positions comprising a "hot" position (in which the outlet of the cold-air duct is closed and the outlet of the hot-air duct is open) and a "cold" position (in which the outlet of the hot-air duct is closed and the outlet of the cold-air duct is open).

Such a device, with a mixing flap of the butterfly type, has the particular drawback that, when the flap passes from the "hot" position to the "cold" position, cold air enters the mixing chamber from a region of the outlet of the cold-air duct which is located close to a free edge of the butterfly flap. This particular region lies exactly on the opposite side to the region of the outlet of the hot-air duct through which the hot airflow enters the mixing chamber, that is to say close to an opposite edge of the butterfly flap. It results therefrom that the cold airflow and the hot airflow have a tendency to be layered, so that mixing of them can occur only a long way from the heating radiator, which requires an increase in the volume of the mixing chamber and hence of the device.

The object of the invention is essentially to surmount such a drawback.

Hence the invention envisages promoting the meeting and the effective mixing of the cold airflow and of the hot airflow in a region closer to the heating radiator, so as to leave space, downstream of the heating radiator, for the distribution of the air.

SUMMARY OF THE INVENTION

According to the present invention there is provided a motor-vehicle heating and/or air conditioning device comprising a cold-air duct, a hot-air duct housing a heating radiator, a mixing chamber communicating with respective air outlets of said ducts, and mixing means suitable for controlling said air outlets in chosen proportions so as to set the temperature of the air in the mixing chamber, wherein at least one mixing means consists of a flap of drum type including a shutter wall which, in the "hot" position, closes off the outlet of the cold-air duct, and, in the "cold" position, closes off the outlet of the hot-air duct, and wherein the wall of the flap exhibits at least one recess such that, when the flap is shifted from the "hot" position to the "cold" position, a cold airflow can pass through the recess so as to encounter a hot airflow.

Hence, the cold airflow and the hot airflow are mixed optimally and, that being so, the size of the mixing chamber can be reduced in comparison with the known devices.

Advantageously, the drum-type flap (144) is a single flap which, in the "hot" position, closes the outlet of the cold-air duct and, in the "cold" position, closes the outlet of the hot-air duct. The wall (148) of the flap is a substantially cylindrical wall which extends between two opposite edges (154, 156). The recess or recesses formed in the wall opens or open out close to the opposite edges in such a way that, when the flap is shifted from the "hot" position to the "cold" position, a cold airflow can pass through the recess so as to meet the hot airflow.

Advantageously, the device includes at least one auxiliary flap suitable for closing off the hot-air duct when the single flap is in "cold" position.

In this case, it is particularly advantageous to provide two auxiliary flaps of the butterfly type, the movements of which are coordinated.

BRIEF DESCRIPTION OF THE DRAWINGS

In the description which follows, given by way of example, reference will be made to the attached drawings, in which.

DESCRIPTION OF THE PREFERRED EMBODIMENT

Figure 1:
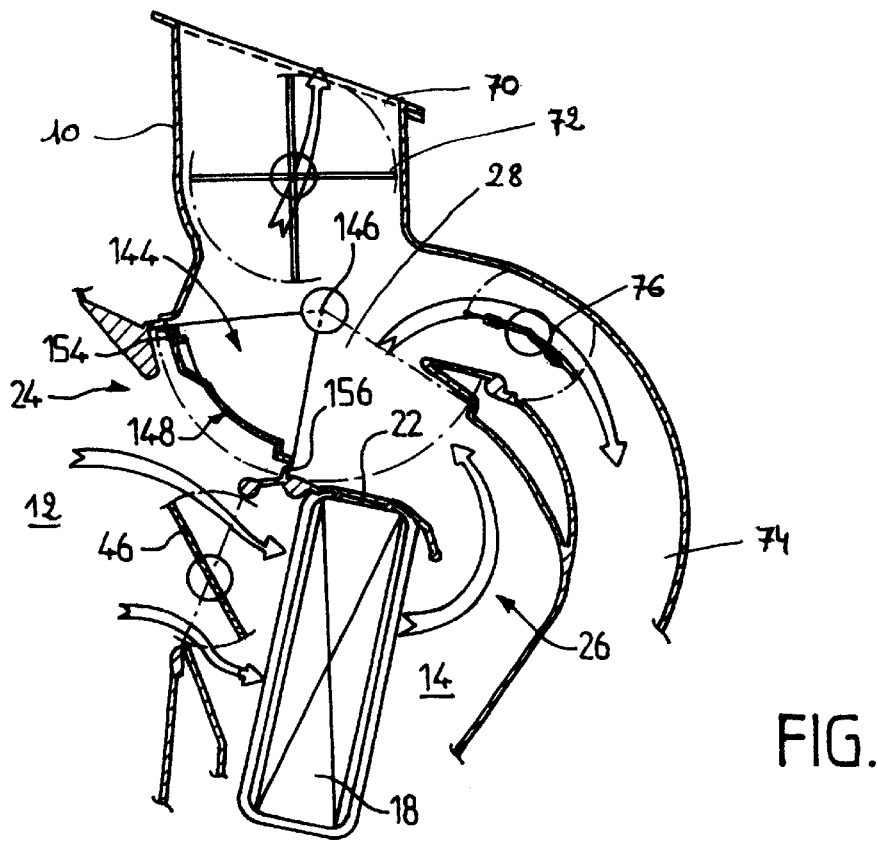
FIG. 1 is a sectional view of the device according to the invention, represented in hot position.

In the various figures, like reference numerals refer to like parts.

Referring first of all to FIG. 1, a device is represented for heating and/or air conditioning the passenger compartment of a motor vehicle. This device comprises a housing 10 delimiting a cold-air duct 12 and a hot-air duct 14, both supplied with cold air (arrow F1) from a common inlet.

The hot-air duct 14, also called air-heating duct, houses a heating radiator 18 suitable for being traversed by a hot liquid, usually the liquid serving for cooling the engine of the vehicle.

In this example, the radiator 18 is placed in a substantially vertical position below a partition 22 which contributes, within the housing 10, to delimiting two air outlets 24 and 26 corresponding respectively to the cold-air duct 12 and to the hot-air duct 14. These two outlets lead into a mixing chamber 28 which is in communication with various air-outlet vents (not represented) distributed throughout the passenger compartment of the vehicle.

When the flap is in the "hot" position, its shutter wall completely closes the outlet 24 of the duct 12 and then extends between the partition 22 and the housing wall, so that the airflow sweeps over the radiator 18.

In FIG. 1, an outlet duct 70 has been represented communicating with the mixing chamber 28 and controlled by a flap 72 in order to feed deicing and ventilation outlets of the vehicle, as well as another outlets duct 74, called "feet duct", controlled by a flap 76.

Figure 2:
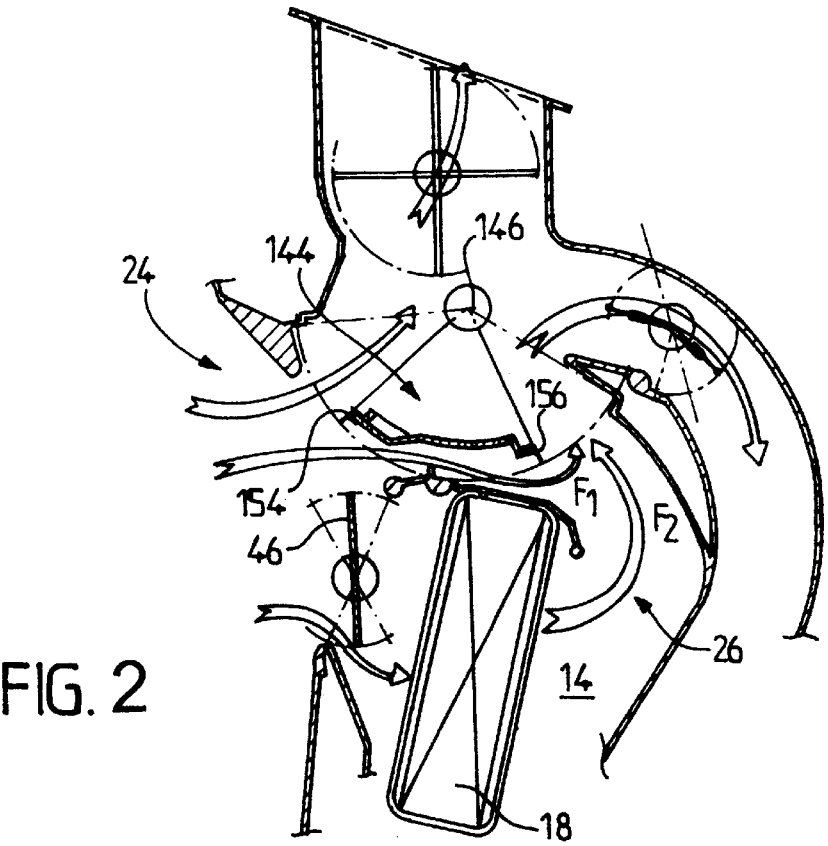
FIG. 2 is a view similar to FIG. 1, in which the device is represented in mixing position.
Figure 3:
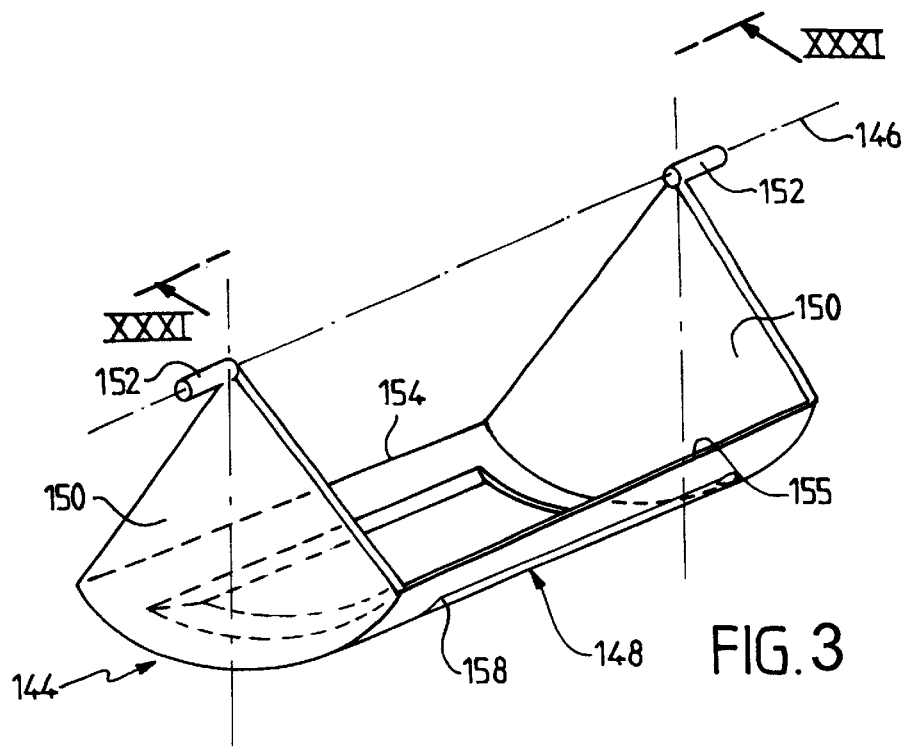
FIG. 3 is a perspective view of the single flap of the device of FIGS. 1 and 2.
Figure 4:
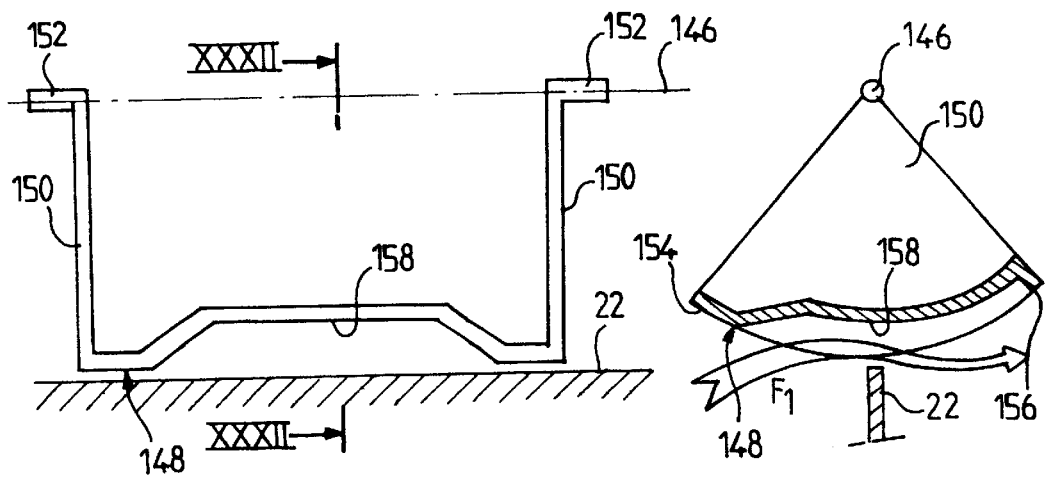
FIG. 4 is a sectional view along the plane XXXI—XXXI of FIG. 3.

The device of FIGS. 1 and 2 comprises a single flap 144 of drum type mounted pivotably about a spindle 146. This flap possesses a wall 148 of generally cylindrical shape mounted between two flanges 150 provided with respective pivots 152 forming the spindle 146 (FIGS. 3 and 4). The wall 146 turns its concave feature on the side opposite the respective outlets 24 and 26 of the cold-air duct 12 and of the hot-air duct 14. The flap can pivot between a "hot" position (represented in solid line) in which the wall 148 closes off the outlet of the cold-air duct and a "cold" position (represented in broken line) in which the wall 148 closes off the outlet of the hot-air duct (FIG. 1).

The device may further comprise an auxiliary flap 46, for example of butterfly type or of flag type, housed in the hot-air duct 14, upstream of the heating radiator 18.

The wall 148 is generally cylindrical and extends between two opposite edges 154 and 156 which constitute two generatrices of the wall. In the "hot" position (FIG. 1), the edge 154 comes into leaktight contact with the housing and the edge 156 with the separation wall 22, which is situated immediately above the heating radiator 28. It should be noted that the wall 148 is partly covered, in its edge region 154, by a catch 157 forming part of the housing. Hence, as long as the flap is in the "hot" position or in an intermediate position close to this "hot" position, for which the edge 154 interacts in a leaktight way with the catch 157, the cold air cannot reach the mixing chamber.

The wall 148 is shaped to include a recess 158 (FIGS. 3, 4 and 5) which extends in a circular arc and opens out in proximity to the opposite edges 154 and 156. In the embodiment of FIGS. 3 and 4, the wall includes a single recess 158.

Figure 5:
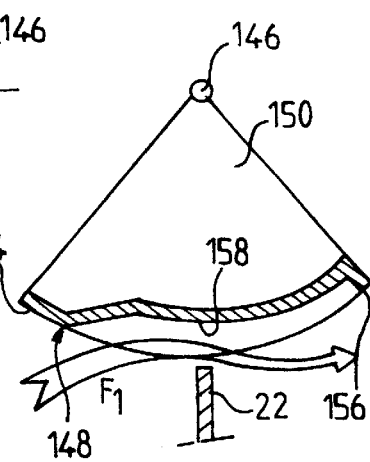
FIG. 5 is a sectional view along XXXII—XXXII of FIG. 4.

It will be understood that, when the flap 144 is in an intermediate position between the "cold" and "hot" positions, the recess 158 constitutes a passage for the cold airflow F1, as shown in FIGS. 2 and 5. This flow can pass between the recessed part of the wall 148 and the separation wall 22.

It results therefrom that, when the flap passes from the "hot" position to the "cold" position, it starts by clearing an air passage which allows the cold airflow F1 to encounter the hot airflow F2 in a region immediately above the radiator 18 (FIG. 2). Obviously, the clearing of this air passage starts when the edge 154 of the wall 148 has stopped interacting with the catch 157.

Figure 6:
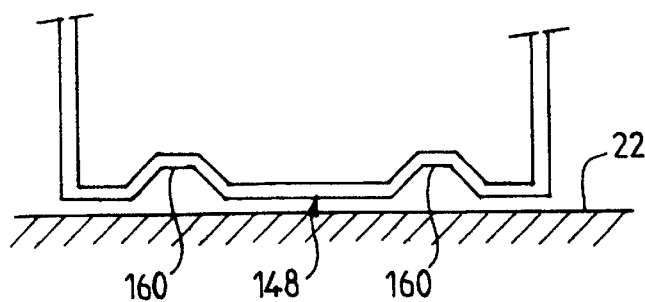
FIG. 6 is a view similar to FIG. 4 in a variant embodiment.

In the embodiment of FIG. 6, the wall 148 includes two recesses 160 constituting two spaced air passages, the principle of operation being the same as above.

Figure 7:
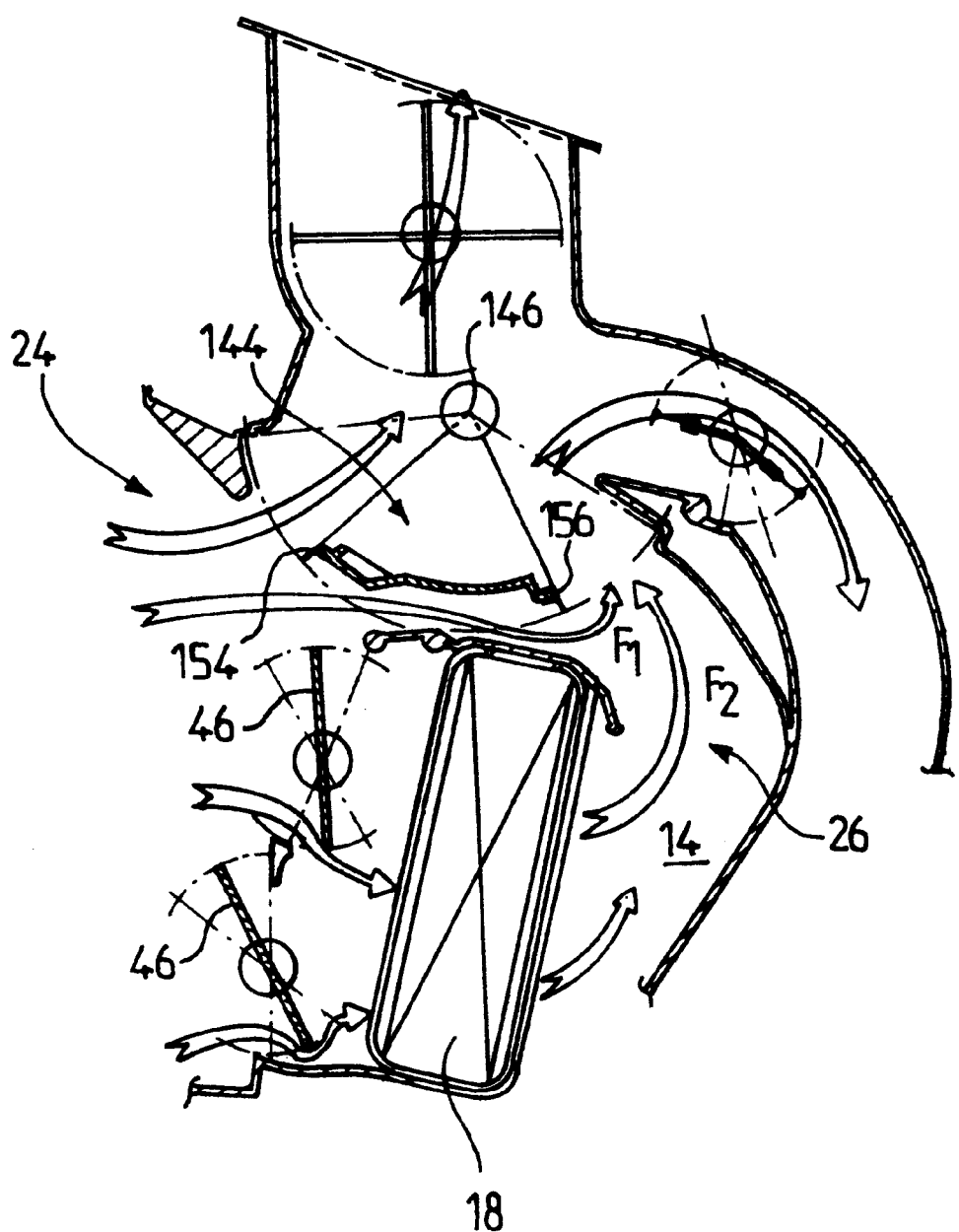
FIG. 7 is a view similar to FIG. 2 in a variant embodiment.

The embodiment of FIG. 7 is closely related to that of FIGS. 1 and 2, except that the device includes two auxiliary flaps 46 of the butterfly type, instead of a single flap. These two flaps are housed in the hot-air duct 14 upstream of the heating radiator 18. Providing two flaps instead of a single flap makes it possible, for an otherwise equal size outlet, to control a larger passage cross-section.

The two flaps 46 have coordinated movements.

Thus they can be opened according to a defined law, one of the flaps opening more or less quickly than the other. This makes it possible, for example, to provide for progressive opening, or else to promote the outflow of condensates in an almost "all cold" position. In this latter case, the flap 46 placed in the upper position is opened first. Then the flap 146 placed in the lower position is opened.

Hence, in all the above-described embodiments, the device comprises mixing means which make it possible, when changing from the "hot" position to the "cold" position, to direct a cold airflow straight into a hot airflow in order to ensure that they mix in a region close to the heat exchanger, which makes it possible to reduce the volume of the mixing chamber, and thus the overall size of the device.

Obviously, the invention is not limited to the embodiments described previously by way of example, and extends to other embodiment variants.

It will be understood, in the context of the invention that, when several flaps are used, it is possible to use flaps of the same type or of different types.

What is claimed is:

1. A motor-vehicle heating and/or air conditioning device comprising
   a cold-air duct,
   a hot-air duct housing a heating radiator,
   a mixing chamber communicating with respective air outlets of said ducts, and
   mixing means suitable for controlling said air outlets in chosen proportions so as to set the temperature of the air in the mixing chamber, wherein said mixing means comprises a flap of drum type including a shutter wall which, in the "hot" position, closes off the outlet of the cold-air duct, and, in the "cold" position, closes off the outlet of the hot-air duct, and wherein the shutter wall includes a recess such that, only when the flap is shifted between "hot" position and the "cold" position, a cold airflow can pass through the recess so as to encounter a hot airflow.

2. The device of claim 1, wherein the mixing means comprises a single mixing flap.

3. The device of claim 2, in which the wall of the flap is a substantially cylindrical and extends between two opposite edges of the flap, the recess formed in the wall opening out close to one of the opposite edges.

4. The device of claim 3, further comprising at least one auxiliary flap suitable for closing off the hot-air duct when the single flap is in a "cold" position.

5. The device of claim 4, which comprises two auxiliary flaps of the butterfly type, the movements of which are coordinated.

6. A motor-vehicle heating and/or air conditioning device comprising
   a cold-air duct,
   a hot-air duct housing a heating radiator,
   a mixing chamber communicating with respective air outlets of said ducts, and
   mixing means suitable for controlling said air outlets in chosen proportions so as to set the temperature of the air in the mixing chamber, wherein said mixing means comprises a flap of drum type including a substantially cylindrical shutter wall that extends between two opposite edges of the flap and which, in the "hot" position, closes off the outlet of the cold-air duct, and, in the "cold" position, closes off the outlet of the hot-air duct, and wherein the shutter wall includes a recess opening out close to one of the opposite edges such that, when the flap is shifted from the "hot" position to the "cold" position, a cold airflow can pass through the recess so as to encounter a hot airflow.

7. The device of claim 6, further comprising at least one auxiliary flap suitable for closing off the hot-air duct when the flap is in the "cold" position.

8. The device of claim 7, which comprises two auxiliary flaps of the butterfly type, the movements of which are coordinated.

9. A vehicle including the heating and/or air conditioning device of claim 6.

10. A motor-vehicle heating and/or air conditioning device comprising:
   a cold-air duct having a cold-air outlet;
   a hot-air duct having a hot-air outlet;
   a mixing chamber communicating with the cold-air outlet and the hot-air outlet; and
   a mixing means for selectively controlling the cold-air outlet and the hot-air outlet to set the temperature of the air in the mixing chamber, the mixing means comprising a drum type flap having a shutter wall with a recess, the drum type flap closing the cold-air outlet when in the "hot" position, closing the hot-air outlet when in the "cold" position, and permitting a cold airflow from the cold-air outlet to pass through the recess and to encounter a hot airflow from the hot-air outlet only when positioned between the "hot" position and the "cold" position.

11. The device of claim 10 further comprising a heating radiator, the heating radiator positioned in the hot-air duct.

12. The device of claim 10 wherein the shutter wall is a substantially cylindrical and extends between opposing edges of the drum type flap, and wherein the recess is proximate at least one of the opposing edges.

13. The device of claim 10 further comprising an auxiliary flap suitable for closing off the hot-air duct when the drum type flap is in the "cold" position.

14. The device of claim 13 wherein the auxiliary flap is a butterfly type flap.

15. The device of claim 10 further comprising at least two auxiliary flaps whose movements are coordinated.

16. The device of claim 15 wherein each auxiliary flap is a butterfly type flap.

* * * * *